United States Patent [19]

Hogan et al.

[11] 4,333,899
[45] Jun. 8, 1982

[54] METHOD AND APPARATUS FOR MOLDING A TIRE

[75] Inventors: James M. Hogan, Tallmadge; Cletus A. Becht, Akron, both of Ohio

[73] Assignee: The Goodyear Tire & Rubber Company, Akron, Ohio

[21] Appl. No.: 99,705

[22] Filed: Dec. 3, 1979

[51] Int. Cl.³ .............................................. B29D 27/00
[52] U.S. Cl. ................................. 264/51; 264/328.3; 264/328.6; 264/328.12; 264/328.16; 264/DIG. 83; 425/543; 425/547; 425/812; 425/817 R
[58] Field of Search .................. 264/DIG. 83, 328.3, 264/328.6, 328.12, 328.16; 425/4 R, 817 R, 542, 556, 577, 589, 812, 543, 547

[56] References Cited

U.S. PATENT DOCUMENTS

| | | | |
|---|---|---|---|
| 2,993,233 | 7/1961 | Hoppe et al. | 264/46.6 |
| 3,605,848 | 9/1971 | Lombardi et al. | 264/46.6 X |
| 3,684,420 | 8/1972 | Barker | 425/817 R X |
| 3,712,778 | 1/1973 | Lidl | 425/817 R X |
| 3,771,928 | 11/1973 | Gostyn et al. | 425/4 R |
| 3,853,446 | 12/1974 | Hostettler et al. | 425/543 X |
| 3,954,537 | 5/1976 | Alfter et al. | 264/DIG. 83 |
| 3,970,732 | 7/1976 | Slaats et al. | 425/817 R X |
| 3,991,147 | 11/1976 | Knipp et al. | 264/DIG. 83 |

FOREIGN PATENT DOCUMENTS 1019519  9/1977  Canada ....................... 264/DIG. 83

Primary Examiner—Philip Anderson
Attorney, Agent, or Firm—Frederick K. Lacher; H. C. Young, Jr.

[57] ABSTRACT

A tire is cast and cured in a stationary mold having an annular mold cavity, an inlet opening and an outlet vent. The mold is tilted for optimum foam flow and minimum air or bubble entrapment. A liquid reactive mixture is injected into the mold through the inlet opening and moves through the mold cavity in different directions providing two leading surfaces which meet to form an interface adjacent the outlet vent. The air, foam gases and interface portion are extruded from the mold cavity through a slot in the vent into a reservoir. After curing of the elastomeric material formed by the liquid reactive mixture in the mold, the material in the slot and reservoir may be severed from the tire.

15 Claims, 10 Drawing Figures

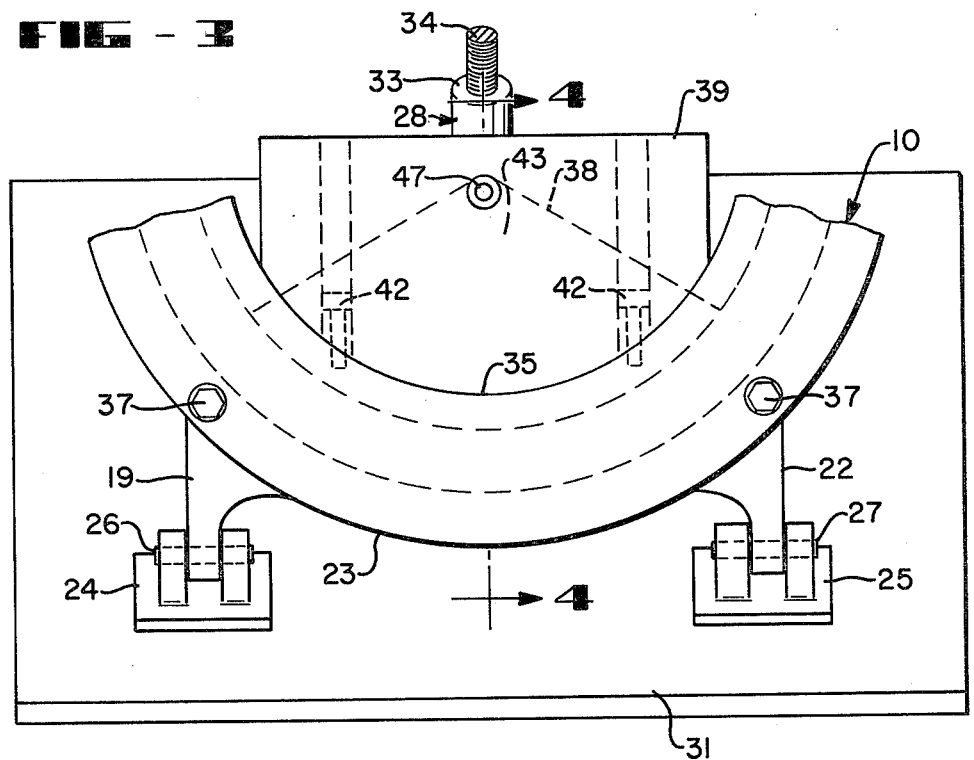
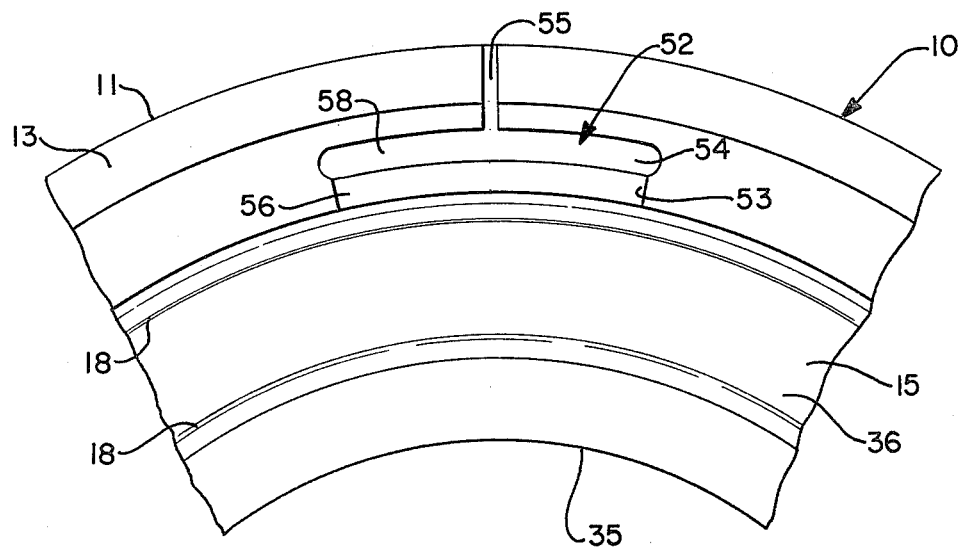

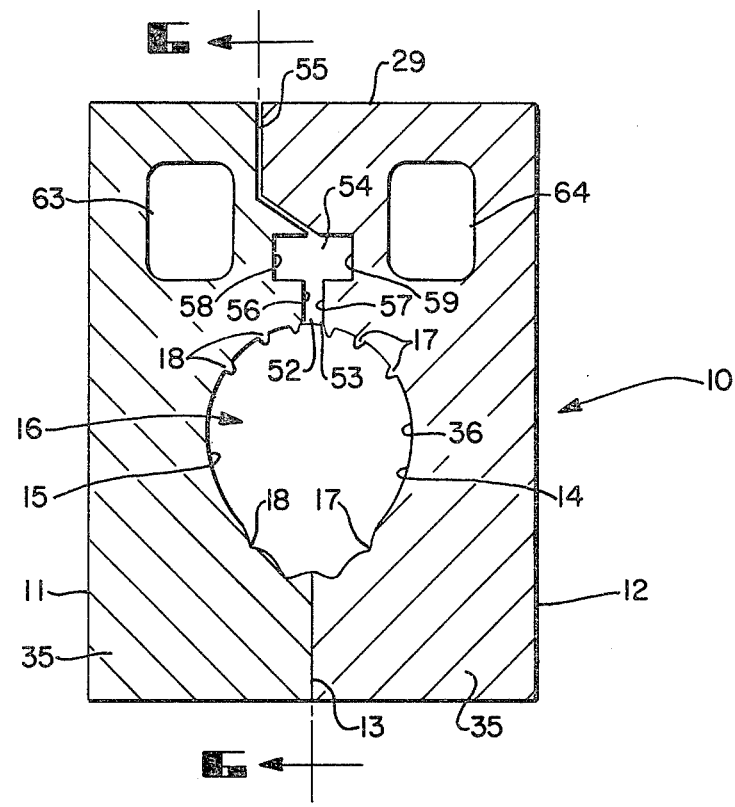
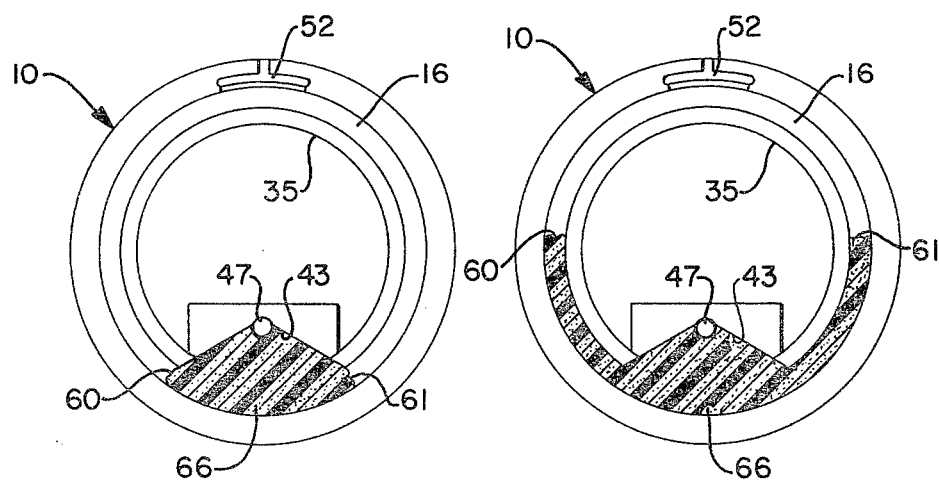
FIG-6
FIG-7     FIG-8

METHOD AND APPARATUS FOR MOLDING A TIRE

This invention relates generally to a stationary tire mold and method of manufacture of a tire which is cast from a liquid reactive mixture to form an elastomeric material such as urethane. It is especially directed to the manufacture of tires in which the liquid reactive mixture forms to provide a generally resilient microcellular inner cushioning structure with an outer wear-resistant skin of greater density. In some processes the mold is manipulated during the injection or foaming of the mixture to avoid air entrapment; however, this is not desirable from a protection standpoint.

In the molding of toroidal objects such as tires in a stationary mold, the liquid reactive mixture usually flows from one inlet into the mold cavity and around an inner mold portion to form the ring-shaped object. It is important to have uniform foam flow as the mold cavity is filled and it has been found that with a stationary mold the best foam flow or distribution is obtained with the mold in a horizontal position, i.e. with the axis of the mold in a vertical position. However air entrapment is a problem when the mold cavity is filled with the mold in a horizontal position. This is evidenced by the voids or large bubbles which appear along the upper annular surface of the molded article.

The air entrapment with a stationary mold is less of a problem when the mold is in a vertical position, i.e., with the axis of the mold in a horizontal position, because the air and gases rise to the top of the mold. In the stationary vertical mold there is still the problem of providing uniform foam flow and adequate venting to remove the air and gases from the upper part of the mold cavity.

The stream of liquid reactive mixture injected at the inlet moves upwardly in different directions around the inner mold portion and the leading surfaces are joined at an interface in the upper portion of the mold cavity. If the air and foam gases are not vented properly the interface portion may contain large voids and therefore not be representative of the rest of the tire. This nonuniformity is undesirable because its results in irregular rolling characteristics of the tire and a weakness at the interface.

Also in the vertical position of the stationary mold the foam flow within the mold cavity is usually uneven and the portion of the molded article at the top of the mold cavity therefore has a different microcellular structure from the portion at the bottom of the mold cavity.

With the foregoing in mind, it is a principal object of this invention to provide a stationary mold for injecting the liquid reactive mixture into the mold cavity quickly and with a minimum or turbulence.

Another object is to provide a mold with an outlet vent for the removal of air, gases and a portion of the molded material from the mold cavity in such a manner that the material ejected through the outlet opening may be severed from the molded article after removal from the mold.

A further object is to provide a mold which may be tilted for improved foam flow and ejection of air and foam gases during the filling of the mold cavity.

A still further object is to provide a method of injecting and molding a ring-shaped article of elastomeric material from a liquid reactive mixture to obtain the optimum flow of the mixture into the mold cavity and removal of air and gases from the chamber during the molding process.

Another object is to provide a method in which the flow of the liquid reactive mixture and the venting of the mold cavity is controlled to provide a uniform structure of the article.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

In the annexed drawings:

FIG. 3 is a fragmentary view taken along the plane of line 3—3 in FIG. 1.

FIG. 5 is a sectional view taken along the plane of line 5—5 in FIG. 2.

FIG. 6 is a fragmentary view taken along the plane of line 6—6 in FIG. 5.

FIGS. 7, 8, 9 and 10 are schematic sectional views showing the movement of the liquid reactive mixture from the inlet opening to the outlet vent during the casting and molding process.

Figure 1:
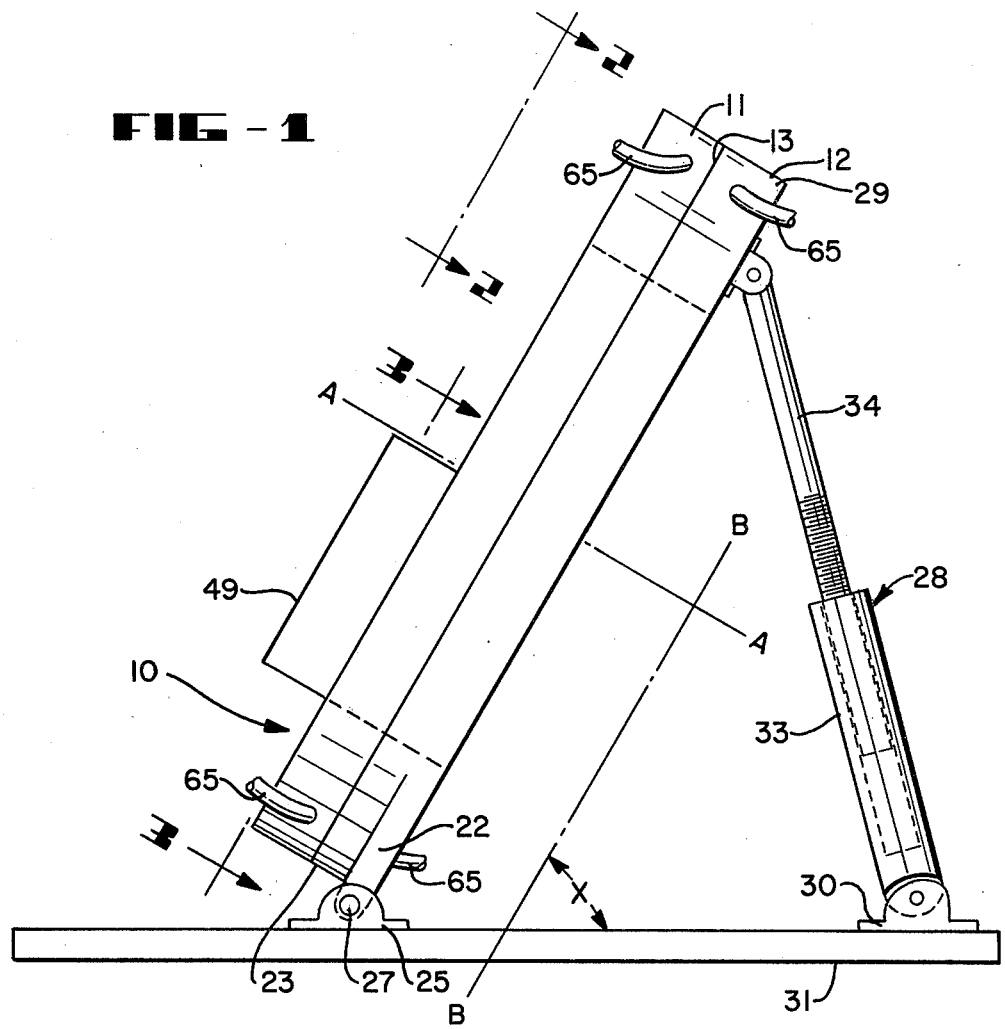
FIG. 1 is a partially schematic side elevation of the mold embodying this invention.
Figure 2:
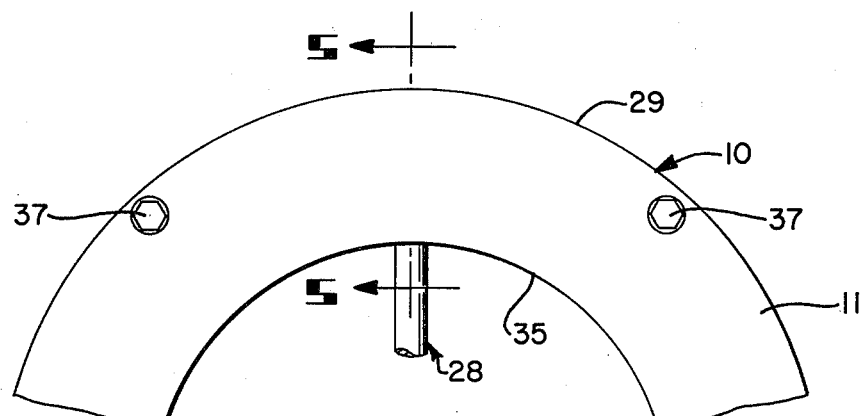
FIG. 2 is a fragmentary view taken along the plane of line 2—2 in FIG. 1.
Figure 4:
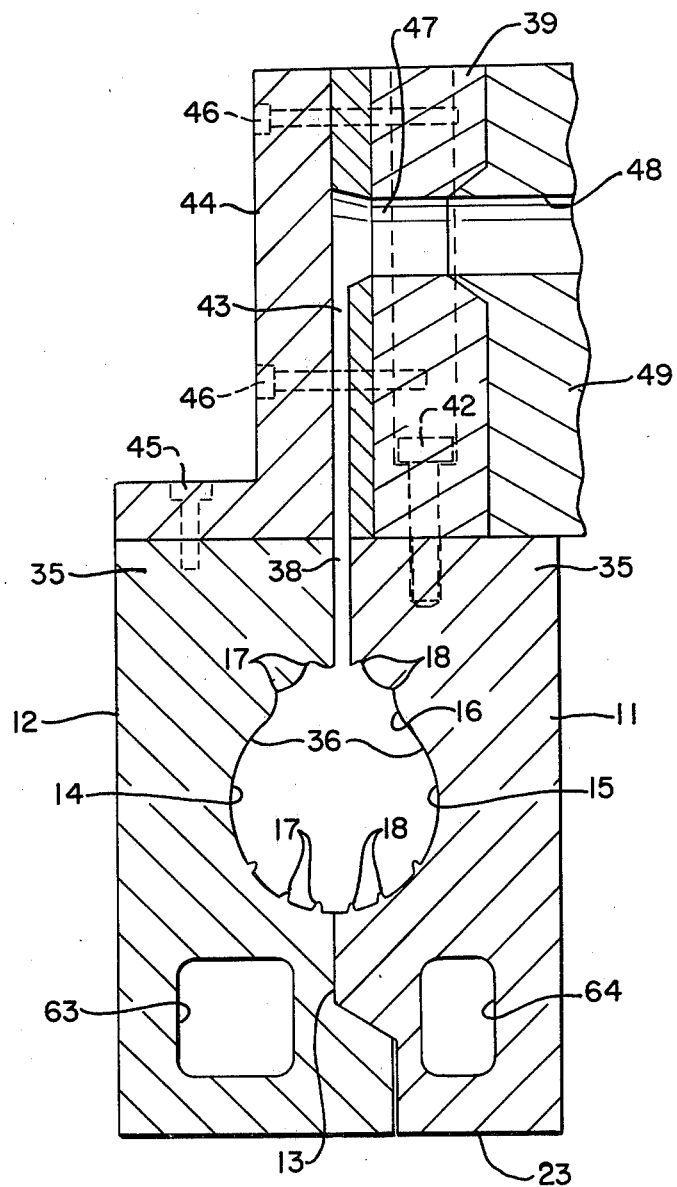
FIG. 4 is a fragmentary sectional view taken along the plane of line 4—4 in FIG. 3.

Referring to FIGS. 1, 2 and 3 a mold 10 for casting an article with an opening such as a toroidal tire is shown. The mold 10 may include two annular sections such as top half section 11 and lower half section 12 joined at a mating surface 13. The mold 10 may be of a rigid material such as aluminum fabricated or cast with a concave annular recess 14 in the lower half section 12 and a matching concave annular recess 15 in the top half section 11 as shown more clearly in FIGS. 4, 5 and 6. In the closed condition of the mold 10, the recesses 14 and 15 define an annular cavity 16 within the mold. As shown in FIGS. 4 and 5 the mold 10 of this embodiment is for a toroidal bicycle tire and the recesses 14 and 15 have ribs 17 and 18 respectively to form the tread and rim engaging portions of the tire.

The mold 10 is stationary and preferably mounted in the tilted position as shown in FIG. 1. In this embodiment the lower half section 12 has brackets 19 and 22 at a lower edge 23 pivotally mounted on supports 24 and 25 having lugs through which pins 26 and 27 extend. Holes in the brackets 19 and 22 are positioned to receive the pins 26 and 27 in hinging relationship so that the mold 10 may be tilted at different angles relative to the horizontal. An adjustable rod 28 is connected to an upper edge portion 29 and to a bracket 30 fastened to the floor plate 31. A sleeve 33 threaded on a shaft 34 may be turned to increase or decrease the length of the adjustable rod 28 and thereby change the amount of tilt of the mold 10.

Referring to FIGS. 3 through 6, a radially inner mold portion 35 is located between the upper edge portion 29 and lower edge portion 23 and provides an inner mold surface 36 of the mold cavity 16 to form the central opening in the tire. The top half section 11 and lower half section 12 are detachably fastened together as by studs 37 extending through holes in the top half section and threaded in holes in the lower half section.

Referring to FIGS. 3 and 4, an inlet opening 38 is located in the mold 10 adjacent the lower edge portion 23 and extending through the radially inner mold portion 35 at the mating surface 13 of the mold. A sprue attachment member 39 is fastened to the inner mold portion 35 by suitable means such as studs 42 and has a fan-shaped distribution channel 43 for distributing the mixture injected into the mold in an even manner to minimize turbulence. A back-up plate 44 closing the channel 43 is attached to the lower half section 12 of the mold 10 as by studs 45 and to the sprue attachment member 39 as by studs 46. A sprue 47 is located at the apex of the fan-shaped channel 43 and is in alignment with a hole 48 in a mixing and injecting apparatus 49 shown schematically in FIGS. 1 and 4. The sprue 47 has a ½ inch (1.25 cm) diameter but may be larger or smaller depending on the mixing and injecting apparatus 49.

Figures 9, 10:
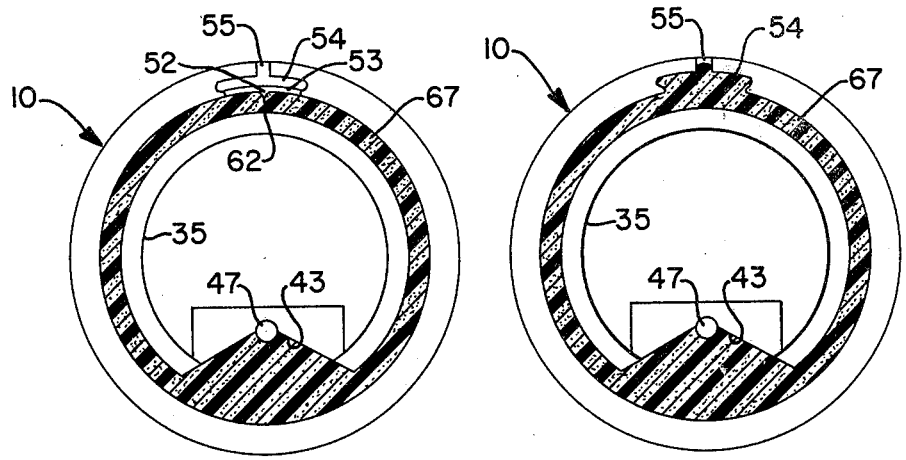

An outlet vent 52 located adjacent the upper edge portion 29 and on the opposite side of the inner mold portion 35 from the inlet opening 38 includes a circumferentially extending slot 53 in communication with a reservoir 54 which is vented to the atmosphere outside the mold 10 by a passage 55. The slot 53 is formed by insets 56 and 57 in the mating surface 13 and the reservoir 54 is formed by elongated recesses 58 and 59 in the mating surface 13 of the top half section 11 and lower half section 12, respectively. The circumferential length of the slot 53 is sufficient to cover the area in which the leading surfaces 60 and 61 of the cast material meet at an interface 62, as shown in FIG. 9, and may be from two inches (5.08 cm) to six inches (15.24 cm) long. In this embodiment the slot 53 is about six inches (15.24 cm) long. The width of the slot 53 is sufficient to vent air and foam gases from the mold cavity 16 while at the same time maintaining a back pressure in the mold cavity during the molding process. In this embodiment the slot 53 has a width of about ½ inch (1.25 cm). The volume of the reservoir 54 is sufficient to receive the material from the interface 62 which may contain voids or other undesirable characteristics. Finally the passage 55 is large enough to release the air and foam gases from the mold cavity 16 during the casting process.

In the embodiment shown the mold cavity 16 has an outside diameter of twenty-six inches (66.04 cm) to produce a twenty-six inch (66.04 cm) diameter tire. The mold 10 has an outside diameter of approximately twenty-eight inches (71.12 cm) and the fan-shaped channel 43 has a depth of about one-eighth of an inch (0.31 cm). The resorvoir 54 which is approximately the same length as the slot 53 has a radial width of about one-half inch (1.25 cm) and an axial depth of about one inch (2.54 cm). The passage 55 from the reservoir 54 has a width of about one-eighth of an inch (0.31 cm) and a depth of about one-quarter of an inch (0.62 cm).

The top half mold section 11 and lower half mold section 12 contain heating chambers 63 and 64, as shown in FIGS. 4 and 6, which may be connected to suitable sources of heating fluid by tubular conduits 65 shown schematically in FIG. 1.

The mold 10 is circular and has an axis A—A as shown in FIG. 1. This axis A—A is tilted relative to the horizontal. The line B—B representing a plane perpendicular to the axis A—A in FIG. 1 indicates the angle X the mold 10 is tilted relative to the horizontal. Preferably the angle X is from forty-five to ninety degrees and in the embodiment shown in FIG. 1 the angle X is about sixty degrees.

In the manufacture of tires in accordance with this invention, the mold 10 in the assembled condition is positioned in a tilted attitude by increasing or decreasing the length of the adjustable rod 28. The mold 10 may be preheated by circulating water or other heating material through the heating chambers 63 and 64 in communication with a heating source by conduits 65. Preheating may not be necessary for certain materials. An elastomeric precursor such as liquid polyurethane reactive mixture 66 is prepared in the mixing and injecting apparatus 49 and then injected into the annular mold cavity 16 with a minimum of turbulence through the inlet opening 38 so that the mixture moves in different directions around the inner mold portion 35 providing leading surfaces 60 and 61.

The injection of the mixture 66 may continue until the annular cavity 16 is partially full as shown in FIG. 8 when the injection may be discontinued into the cavity. The reaction of the mixture 66 will continue and produce foam 67 with the foam flow continuing to fill the annular cavity 16. This reaction continues until the leading surfaces 60 and 61 of said flowing mixture meet at the interface 62. Ahead of the leading surfaces 60 and 61 will be air and foam gases which are ejected through the slot 53, reservoir 54, and passage 55 as shown in FIG. 9. The foam 67 continues to flow through the slot 53 into the reservoir 54 so that any voids or trapped air at the interface 62 will be transferred to the reservoir.

The temperature of the mold 10 may be maintained or increased during molding until the elastomeric material is cured after which the mold is opened and the molded tire removed from the mold. Then after severing the material cured in the fan-shaped channel 43 and in the slot 53 and reservoir 54 the tire will be ready for use. It is also understood that in accordance with this invention, the injection of the liquid reactive mixture 66 may continue until the annular cavity 16 is completely filled whereupon the amount of foaming will be limited or the injection may be terminated with the annular cavity filled less than halfway, as shown in FIG. 8, to provide greater foaming of the material and a more porous tire.

An example of the material which would be suitable for this process is shown in the following table:

TABLE I

| Ingredients | Parts by Weight |
| --- | --- |
| Polypropylene ether triol, 4800 molecular weight | 80 |
| Ethylene glycol | 11 |
| Diethanol carbamate | 6.7 |
| Organotin and tertiary amine catalysts | 0.1 |
| Carbon black | 1.5 |
| Quasi prepolymer* | 119.2 |

*The quasi prepolymer is the isocyanate terminated reaction product of 7 mols of flake MDI and one mol of a polyethylene/butylene adipate of 1000 molecular weight.

The temperatures to which the mold is preheated and at which the mixture is cured preferably range from 75° C. (24° C.) to 180° F. (82° C.). The curing times range from one to sixty minutes; however, it is understood that with certain materials the curing time could range from one minute to several hours depending on materials, size and complexity of the article. The injection and filling time for the mold is from one to forty-five seconds. The backpressure within the mold and the range of pressures at which the mixture is injected into the annular cavity 16 at the inlet opening 38 is preferably from two to ten pounds per square inch to obtain the proper flow with minimum turbulence. It is understood that this pressure may be as high as fifty and even as high as two hundred pounds per square inch with certain materials and mixing techniques.

With the apparatus and method of this invention, tires and similar articles may be formed virtually void-free with a uniform microcellular structure throughout the article. All this may be done with a stationary mold making possible the maximum production at a minimum cost.

While a certain representative embodiment and details have been shown for the purpose of illustrating the invention it will be apparent to those skilled in the art with various changes and modifications may be made therein without departing from the spirit or scope of the invention.

We claim:

1. A method of molding an article with an opening through the article from a liquid reactive elastomeric mixture adapted to be cast and cured in an annular mold cavity of a rigid mold tilted relative to the horizontal so that said mold will have an upper edge portion and a lower edge portion, and having an inlet opening provided in said mold adjacent said lower edge portion, comprising injecting the reactive mixture through said inlet openings into the mold cavity whereby it flows in different directions around an inner mold portion along an inner mold surface of said cavity providing at least two leading surface portions of said flowing mixture, joining said leading surface portions to form an interface portion in said mold cavity, ejecting said interface portion from said mold cavity through an outlet vent provided in said mold at a location adjacent said upper edge portion of said mold where said leading surface portions meet, curing said reactive mixture to form an elastomeric material, removing said article from said mold and severing said interface portion ejected through said outlet vent from said mold cavity to provide a substantially uniform molded article of elastomeric material.

2. The method of claim 1 wherein said liquid reactive elastomeric mixture is a foamable liquid reactive elastomeric mixture to form a microcellular product and is injected into said mold cavity until said cavity is at least partially full and continuing to cure said reactive material during the foaming process so that the leading surfaces of the foam will meet at said interface portion and air and gases along with said interface portion are ejected from said cavity into said outlet vent.

3. The method of claim 1 further comprising heating said mold to cure said liquid reactive mixture to form an elastomeric material.

4. The method of claim 1 wherein said liquid reactive mixture is injected into said cavity in a period of time from one to forty-five seconds.

5. The method of claim 3 wherein said mold is heated to a temperature in the range of from about 75° F. (24° C.) to about 180° F. (82° C.).

6. The method of claim 5 wherein the curing time of said article in said mold is from about one minute to about sixty minutes.

7. The method of claim 2 further comprising providing said outlet vent with a passage in communication with the atmosphere which is of a size limiting the flow of air and foam gases to provide a back pressure for minimizing the turbulence of the material injected into said cavity.

8. The method of claim 7 wherein said back pressure developed during injection and foaming is in the range of from about 2 psi to about 50 psi.

9. A mold for an article with an opening through the article adapted to be cast and cured from a non-foamable or foamable liquid reactive elastomeric mixture comprising a mold body of rigid material having an annular mold cavity, said mold body being disposed at an angle to the horizontal with an upper edge portion and a lower edge portion, an inner mold portion of said mold body located between said upper edge portion and said lower edge portion, said inner mold portion providing an inner mold surface of said mold cavity to form said opening in said article, an inlet opening in said mold provided adjacent said lower edge portion on one side of said inner mold surface and an outlet vent opening on said mold cavity provided in said mold adjacent said upper edge portion above and on an opposite side of said inner mold portion from said inlet opening, said inlet opening having means for directing said liquid reactive mixture into said annular mold cavity for movement in more than one direction around said inner mold portion providing at least two leading surfaces flowing towards said outlet vent, said outlet vent being positioned where said leading surfaces form an interface whereby said outlet may vent air and foam gases from said mold cavity and receive at least a portion of said liquid reactive elastomeric mixture from said mold cavity to provide a substantially uniform molded article of elastomeric material.

10. The mold according to claim 9 wherein said outlet vent includes a circumferentially extending slot through which said air and foam gases and a portion of said liquid reactive mixture from said mold cavity may be ejected, and said slot having a circumferential length sufficient to cover the area in which said leading surfaces meet to form said interface.

11. The mold according to claim 9 or 10 wherein said outlet vent opens on a reservoir within the mold for receiving said liquid reactive mixture ejected through said opening and said reservoir being vented to the atmosphere.

12. The mold according to claim 9 wherein said mold body is tilted at an angle of from 45 to 90 degrees relative to the horizontal.

13. The mold according to claim 9 wherein said mold body is tilted at an angle of around 60 degrees to the horizontal.

14. The mold according to claim 9 wherein said article is toroidal and said mold cavity is annular with said inner mold portion at the central portion of the mold, said mold body having a central axis and said axis being tilted to the horizontal.

15. The mold according to claim 14 wherein said mold body comprises at least two annular sections with a mating surface and said inlet and outlet being located in said mating surface.

* * * * *